United States Patent [19]

Karikawa et al.

[11] 4,245,901
[45] Jan. 20, 1981

[54] INTERCHANGEABLE-LENS TYPE TTL AUTOMATIC EXPOSURE CAMERA

[75] Inventors: Tohru Karikawa, Tokyo; Kunio Mita, Fukuoka, both of Japan

[73] Assignee: Asahi Kogaku Kogyo Kabushiki Kaisha, Tokyo, Japan

[21] Appl. No.: 915,685

[22] Filed: Jun. 14, 1978

[30] Foreign Application Priority Data

Jun. 15, 1977 [JP] Japan .................................. 52/70772

[51] Int. Cl.³ .......................... G03B 7/08; G03B 9/02
[52] U.S. Cl. ..................................... 354/43; 354/46; 354/30; 354/270
[58] Field of Search .................. 354/26, 29, 30, 38, 354/42, 43, 46, 228, 230, 232, 270, 271, 274, 286, 288, 253, 272; 352/14.1

[56] References Cited

U.S. PATENT DOCUMENTS

| | | | |
|---|---|---|---|
| 2,616,342 | 11/1952 | Thompson | 354/288 X |
| 3,552,289 | 1/1971 | Fujimoto | 354/46 X |
| 3,858,224 | 12/1974 | Heaney | 354/42 |
| 3,962,711 | 6/1976 | Cutler | 354/286 X |
| 3,968,504 | 7/1976 | Komine | 354/46 |
| 3,977,012 | 8/1976 | Erlichman | 354/29 |

FOREIGN PATENT DOCUMENTS 233870   11/1944   Fed. Rep. of Germany ............. 354/26

Primary Examiner—L. T. Hix
Assistant Examiner—William B. Perkey
Attorney, Agent, or Firm—Sughrue, Rothwell, Mion, Zinn and Macpeak

[57] ABSTRACT

Automatic exposure control is enhanced by providing a fixed diaphragm equivalent to the maximum aperture of the adjustable camera diaphragm so that the fixed diaphragm limits the maximum aperture to a consistent value. Consistent light measurements are possible as long as the lens being used does not interfere with the quantity of light entering the diaphragm.

2 Claims, 4 Drawing Figures

INTERCHANGEABLE-LENS TYPE TTL AUTOMATIC EXPOSURE CAMERA

BACKGROUND OF THE INVENTION

Known interchangeable-lens, TTL light measuring type, single lens reflex cameras are generally classified into two types: one is a so-called diaphragm preferential, automatic exposure type in which a diaphragm value is preset and a shutter speed is determined according to a quantity of light: and the other is a so-called shutter speed preferential, automatic exposure type in which a shutter speed is preset and a diaphragm value is determined according to the quantity of light. Both such cameras require a so-called diaphragm interlocking mechanism for transmitting a diaphragm value from the lens to the body and vice versa, resulting in a complicated construction. Referring to a known diaphragm preferential, TTL light measuring single lens reflex camera by way of example, since the measurement of light is effected with an objective lens maintained in a fully open position, if the brightness of an object remains the same, the quantity of light incident on a light receiving element varies greatly according to the difference in aperture value at the fully open position of the particular objective lens used. For this reason, the measurement of light is not possible unless correction is made by transmitting from the lens to the body information of the aperture value in the fully open position of the objective lens. Such a camera thus requires a mechanism for transmission of information concerning the aperture value of the objective lens in the fully open position. Upon photographing, since the diaphragm is stopped down to a set aperture value, unless information of the set aperture value is transmitted from the lens to the body, a proper exposure time can not be calculated according to the value of light measured, unless the value remains intact. A diaphragm interlocking mechanism is thus needed. In addition, a diaphragm operating mechanism is necessary for stopping down the diaphragm of an objective lens to a set aperture value. Such diaphragm mechanism need be provided for every interchangeable lens; however, the provision of such mechanisms in the conventional camera leads to a costly camera.

SUMMARY OF THE INVENTION

To overcome the above-described shortcomings, the present invention is directed to providing a camera wherein there are provided on the body a shutter (a so-called program shutter) for controlling an exposure time and a diaphragm aperture at that time and a fixed diaphragm member for setting a maximum aperture value disposed adjacent to a shutter blade; and there is used an objective lens which does not hinder the quantity of light entering the fixed diaphragm, so that the necessity for a mechanism for correcting an aperture value at a fully open position, a diaphragm interlocking mechanism and a diaphragm operating mechanism is eliminated, whereby a less costly camera is produced.

DETAILED DESCRIPTION OF THE INVENTION

Figure 1:
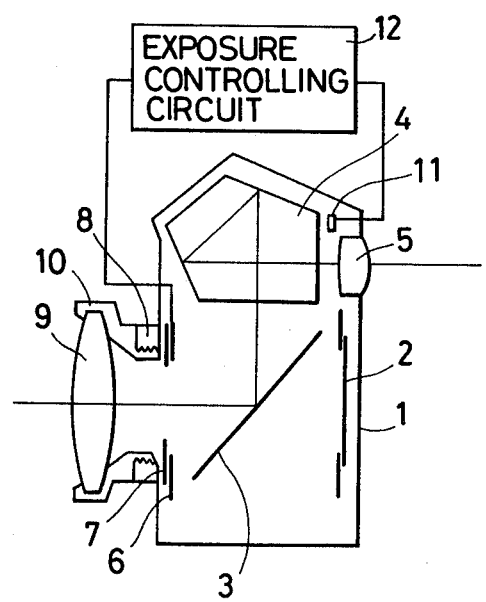
FIG. 1 is a schematic illustration of an automatic exposure camera utilizing the present invention.

FIG. 1 is a schematic view of a single lens reflex camera in which the present invention is embodied. Shown at 1 is a camera body, at 2 a film, and at 3 a mirror which normally shields the film plane lighttightly. Shown at 4 is a pentagonal prism, at 5 an occular lens and at 6 a shutter blade normally maintained at a fully open position. Shown at 7 is a stationary diaphragm for setting a maximum aperture, at 8 a mount provided in the camera body, at 9 an objective lens, at 10 a lens barrel including a mount on the lens side and at 11 a light receiving element. In the drawing, the camera is shown at its light-measuring condition. Light which has passed through lens 9, fixed diaphragm 7, mirror 3 and pentagonal prism 4 is measured by light receiving element 11. This camera operates in like manner as an ordinary single lens reflex camera with a lens shutter, so that, upon release, the value of light measured by light receiving element 11 is first detected, the shutter blade is then turned to a closed position, the mirror is moved to an upper position, an exposure controlling circuit determines an exposure time and an aperture value according to the value of measured light detected, thereby causing the shutter blade to effect an exposure operation, the mirror is then moved to a lower position, and then the blade resumes the fully open condition.

Figure 2A:
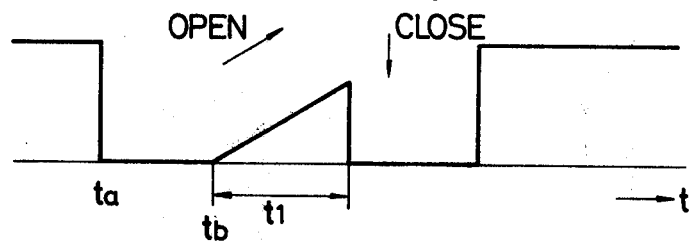
FIGS. 2(a) and (b) are timing diaphragms illustrating the operation of the present invention.
Figure 2B:
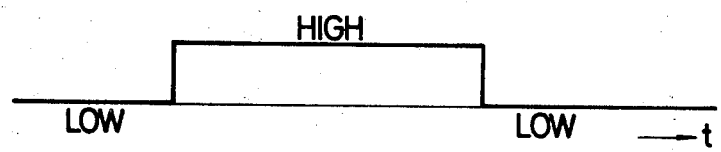

FIG. 2(a) and FIG. 2(b) schematically show the movement of the shutter blade and the mirror, respectively, with respect to time in an exposure operation sequence. In an initial state, the shutter blade is in an open position and the mirror is in a lower position. When the shutter release is operated at a time (ta), the value of light measured by a light receiving element 11 is stored in an exposed controlling circuit 12, the shutter blade is once completely turned to a closed position regardless of the exposure controlling circuit and then the mirror is moved to the upper position. Thereafter, the shutter blade starts opening from a time (tb) at a constant rate and is closed after the time ($t_1$) determined by the exposure controlling circuit. Thus, the shutter blade operates both as a shutter and as an adjustable diaphragm. After a completion of closing of the shutter blade, the shutter blade is opened up and then the mirror is moved to the original lower position regardless of the exposure controlling circuit. However, since the shutter blade is very quickly closed, the time required for its closing may be neglected.

Figure 3:
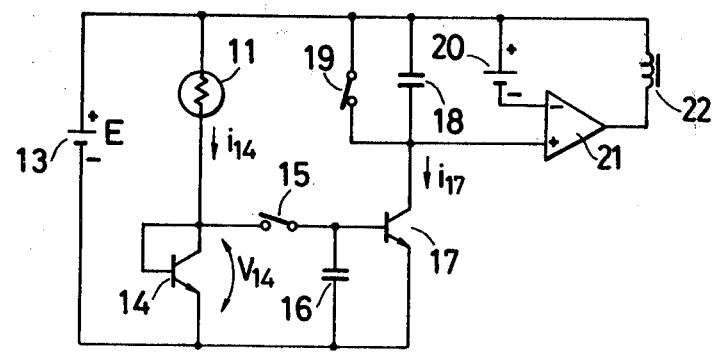
FIG. 3 is a circuit diaphragm of an exposure controlling circuit according to the present invention.

FIG. 3 is a circuit diaphragm showing a practical example of the exposure controlling circuit according to this invention. In FIG. 3, the light receiving element 11 is formed by CdS. The light receiving element is connected at one end to a power supply 13 and at the other end to the collector of a diode connected transistor 14. The collector of the transistor 14 is connected through a switch 15 to a condensor 16 and also to the base of a transistor 17. A collector of the transistor 17 is connected to a condenser 18, a switch 19 and the non-inverting input terminal of a comparator 21. The inverting terminal of the comparator 21 is connected to a reference current source 20. The output terminal of the comparator 21 is connected to a magnet 22.

In the initial state, a switch 15 and a switch 19 are closed and the magnet 22 is energized. The resistance value of the light receiving element 11 is varied according to the object brightness and, accordingly, the current $i_{14}$ and the voltage $V_{14}$ corresponding to the object brightness are obtained and the condensor 16 is charged. Since the switch 15 is so designed as to be closed before the release operation and be opened between the times (ta) and (tb) in relation to the release operation, the voltage $V_{14}$ is stored in the condensor 16. The switch 19 is so designed as to be opened at opening of the shutter i.e. at time (tb) and at that time the collector current $i_{17}$ corresponding to the voltage $V_{14}$ starts flowing and the condensor 18 thus becomes charged. The voltage charged in the condensor 18 and the voltage of the reference current source 20 are applied, respectively, to the non-inverting terminal and the inverting terminal of the comparator 21. When the voltage in the former is lower than in the latter, the output signal from the comparator 21 is inverted thereby deenergizing the magnet 22. During the exposing operation, when the magnet is energized the closing operation of the shutter is not accomplished and when the magnet is deenergized the shutter is operated. Accordingly, in the programmed shutter, the exposure control is achieved in accordance with the object brightness by controlling the time ($t_1$) suppressing the closing operation of the shutter.

According to the present invention, since an exposure time and an aperture value are determined by measuring the light which has come to the light receiving element through the fixed diaphragm, any type lens may be used as long as the lens has an aperture of such an extent as does not block the passage of the light, or any type interchangeable lens different in focal length is available, so far as such interchangeable lens meets the condition described. This lens requires neither a diaphragm blade nor a diaphragm interlocking mechanism for transmission of informations of an aperture value at a fully open position of the lens and an aperture value set, for the correction of a value of light measured. Thus, there results the simplicity in construction of the objective lens as well as in construction of the body side, with the production of a less costly camera.

What is claimed is:

1. In an interchangeable lens type automatic exposure camera of the type having an objective lens, an adjustable diaphragm having a maximum aperture position, a light receiving element for receiving light which actually passes through said objective lens for measuring the quantity of light passing through said lens and said adjustable diaphragm when said adjustable diaphragm is in its maximum aperture position and an exposure controlling circuit for automatically controlling an exposure time and diaphragm aperture according to the quantity of light detected by said light receiving element, the improvement comprising:
   a fixed diaphragm member adjacent said adjustable diaphragm and having an aperture which limits to a constant value the quantity of light passing through said adjustable diaphragm when in its maximum aperture position.

2. A camera according to claim 1, wherein the effective aperture of said objective lens does not limit the quantity of light entering said fixed diaphragm.

* * * * *